3,829,532
FLAME-RESISTANT POLYESTER COMPOSITION
Gilbert K. Meloy, Chagrin Falls, and Diane G. Farrington, Euclid, Ohio, assignors to The Standard Oil Company, Cleveland, Ohio
No Drawing. Continuation-in-part of application Ser. No. 172,892, Aug. 18, 1971, which is a continuation-in-part of application Ser. No. 822,023, May 5, 1969, both now abandoned. This application Apr. 20, 1973, Ser. No. 352,910
Int. Cl. C08g 17/10, 17/12
U.S. Cl. 260—864     7 Claims

ABSTRACT OF THE DISCLOSURE

Thermosetting compositions and cured articles therefrom having markedly enhanced flame resistance are composed of a halogen-containing polyester-monomer mixture in which are included certain amino triazines, amides or amidines.

---

This application is a continuation-in-part of co-pending application Ser. No. 172,892 filed Aug. 18, 1971, now abandoned, and a continuation-in-part of application Ser. No. 822,023 filed May 5, 1969, now abandoned.

The present invention relates to thermosetting polyester compositions having excellent flame resistance and more particularly pertains to flame-resistant, thermosetting compositions composed of a halogen-containing unsaturated polyester material and an amino triazine, amide or amidine or mixtures thereof and to a method for the manufacture of same.

The terms used in connection with flame resistant materials are sometimes confusing. "Fire resistance" and "flame resistance" are often used in the same context as the terms "fireproof" and "flameproof." A material that is flame-resistant or fire-resistant will not continue to burn or glow once the source of ignition has been removed, although there will be some change in the physical and chemical characteristics. The terms fireproof or flameproof, on the other hand, refer to a material which is totally resistant to fire or flame. Asbestos is an example of a fireproof material.

It is known that olefinically unsaturated polyesters can be cured with catalysts or initiators through the olefinic double bond to produce thermoset products and that the flame resistance of these products can be improved by including bound halogen in said polyesters. The bound halogen is included in the polyester by use of halogen-containing monomer or monomers used in the formation of the polyester or by adding to the polyester an additive or additives which contain bound halogen. It is also known that the inclusion of phosphorous compounds or antimony compounds in these halogen-containing polyesters sometimes enhances the flame resistance of the product. Inorganic flame retardants, such as $Sb_2O_3$, also function as pigments and render polyesters in which they are included opaque.

We have discovered that the flame resistance imparted to cured unsaturated polyester materials by including halogen in them can be markedly improved by the further inclusion of certain amino triazine, carboxamide and amidine-type materials therein. The flame resistant polyester materials embodied in this invention are not rendered opaque by the inclusion of the amino triazines, carboxamides or amidines.

Halogen-containing olefinic polyesters and particularly chlorine- and bromine-containing polyesters of the alkyd type and mixtures thereof with liquid cross-linking monomers of many types are well known, such as those disclosed in the co-pending U.S. patent application of O. Zaske, C. H. Fintelmann and H. B. Igdaloff, Ser. No. 652,411 filed July 11, 1967; U.S. Pats. Nos. 3,389,192; 3,365,424; 3,333,022; 3,299,173; 3,196,191; 2,931,746; 2,909,501; 2,819,247; 2,783,215; 2,779,700; German Pat. No. 1,263,297; and in other prior art publications. It is also possible to incorporate halogen into an alkyd resin by halogenation of the alkyd after it has been formed with chlorine, bromine, or chlorination or bromination agents.

The unsaturated polyesters useful in this invention must contain unsaturation which is capable of copolymerization with the unsaturation in the cross-linking monomer, which is usually styrene. Such copolymerizable unsaturation is an essential characteristic of the unsaturated polyester portion of the mixture of this invention. The polyesters are rendered copolymerizable in the cross-linking or curing reaction by incorporating in the esterification-condensation polyester product a reactive and unsaturated chemical ingredient which retains its active unsaturation after being chemically combined in the polyester chain. A particularly suitable material for this purpose is maleic anhydride; however, any unsaturated polycarboxylic acid or anhydride or polyhydric alcohol or esters thereof, including the acid chlorides, capable of esterification without losing its ability to copolymerize with olefinic cross-linking agents may be employed.

The polymerizable polyesters of this invention are prepared by the esterification-condensation reaction of a polyhydric alcohol with a reactive, ethylenically-unsaturated, polyfunctional chemical ingredient which retains its active ethylenic unsaturation after being chemically combined in the polyester chain in approximately stoichiometric proportions, i.e., chemically equivalent proportions of carboxyl and hydroxyl groups. The unsaturated polyfunctional chemical can be an olefinically unsaturated compounds, such as maleic anhydride, and there may also be included some non-olefinically unsaturated dibasic acid or anhydride.

The reactive, ethylenically-unsaturated, polyfunctional chemical ingredient which retains its active ethylenic unsaturation after being chemically combined in the polyester chain and renders the polyester copolymerizable with olefinic cross-linking agents can be an unsaturated polycarboxylic acid or anhydride, such as maleic anhydride, maleic acid, fumaric acid, citraconic acid, itaconic acid, tetrahydrophthalic anhydride or acid, and the like. There also may be included in place of some of the reactive, ethylenically-unsaturated polyfunctional chemical ingredient one or more materials, such as o-phthalic anhydride or acid, isophthalic acid, terephthalic acid, adipic acid, and halogenated derivatives of the foregoing and other materials.

The polyhydric alcohol to be employed can be a saturated aliphatic polyol or an ether alcohol, such as ethylene glycol, propylene glycol, 1,3-propanediol, neopentyl glycol, pentaerythritol, diethylene glycol, dipropylene glycol, triethylene glycol, tetraethylene glycol, or mixtures of these and halogenated derivated thereof.

Olefinic cross-linking agents which can be used in conjunction with the olefinically unsaturated polyesters include vinyl or vinylidene monomers, such as styrene, vinyl toluene, vinyl xylene, ethyl vinyl benzene, isopropyl styrene, t-butyl styrene, the chlorostyrenes, fluorostyrenes, bromostyrenes, the dichlorostyrenes, the dibromostyrenes, divinyl benzene, divinyl toluene, acrylic esters, methacrylic esters, vinyl esters such as vinyl acetate, diallylphthalate and the like and mixtures thereof.

The preferred polyesters or alkyd resins for use in the present invention are those containing sufficient olefinic unsaturation so as to be thermosetting, and this olefinic unsaturation is preferably in the polyesters in the form of unsaturated dibasic acid moieties. The other portions of the preferred polyester molecules may be composed of saturated dibasic acid, aliphatic polyhydric alcohol and polyhydric alcohol moieties and halogenated derivatives thereof. The molar ratio of saturated dibasic acid to unsaturated dibasic acid employed may range from about 0.5:1 to about 5:1. Specific illustrative unsaturated dibasic acids and anhydrides, saturated dibasic acids and anhydrides, aliphatic polyhydric alcohols and aromatic polyhydric alcohols useful in the preparation of the preferred polyesters of the present invention include the following:

UNSATURATED DIBASIC ACIDS AND ANHYDRIDES maleic acid
chloromaleic acid
ethyl maleic acid
maleic anhydride
citraconic anhydride
muconic acid
fumaric acid
aconitic acid
mesaconic acid
itaconic acid 2,3 - dicarboxy - 5,8 - endomethylene - 5,6,7,8,9,9-hexachloro - 1,2,3,4,4a,5,8,8a - octohydronaphthalene anhydride
Diels-Alder adduct of hexachlorocyclopentadiene and maleic anhydride (3,4,5,6,7,7-hexachloro-3,6-endomethylene-4-cyclohexene-1,2-dicarboxylic acid anhydride)
tetrahydro phthalic acid or anhydride

SATURATED DIBASIC ACIDS AND ANHYDRIDES adipic acid
azelaic acid
sebacic acid
dodecyl succinic acid
succinic acid
tetrachlorophthalic anhydride
tetrabromophthalic anhydride
phthalic anhydride
phthalic acid
isophthalic acid
hexahydrophthalic anhydride
malonic acid
citric acid

ALIPHATIC POLYHYDRIC ALCOHOLS ethylene glycol
propylene glycol
trimethylene glycol
triethylene glycol
pentaethylene glycol
polyethylene glycol
1,4-butanediol
diethylene glycol
dipropylene glycol
2,2-dimethyl-1,3-propanediol
hexamethylene glycol
1,4-cyclohexane dimethanol
dibromo neopentyl glycol

AROMATIC POLYHYDRIC ALCOHOLS xylene alcohols
ethyl resorcinol
propyl resorcinol
2,4-dimethyl resorcinol
3,6-dimethyl-1,2,4-benzenetriol
ethyl pyrogallol
2,4-methyl-1,4-dihydroxy naphthalene
3-methyl-1,4,5-naphthalene triol
dimethylol toluene
dimethylol xylene
bis-hydroxyl ethyl or bis-hydroxyl propyl ethers of resorcinol, catechol, hydroquinones
1,5-dihydroxynaphthalene
4,4'-isopropylidene-bis-phenol, etc.

Halogen and preferably chlorine or bromine or both can also be included in olefinic polyesters by mixing therewith a halogen-containing compound such as halogenated hydrocarbon oils and waxes, bromo-diphenyl ethers, halogenated polyethylene, halogenated polypropylene, halogenated polystyrene, halogenated rubber, sulfochlorinated polyethylene, polyvinyl chloride, polyvinylidene chloride, polytetrafluoroethylene, hexahalocyclopentadiene dimer, pentabromotoluene, and the like. It is preferred that the polyester resin-cross-linking monomer mixtures employed in this invention contain at least about 1% by weight of halogen and it is more preferred that they contain at least about 5% by weight of halogen.

The amino triazine compounds which can be employed in the present invention are those having the structures:

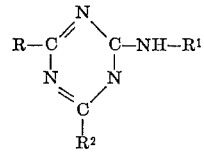

and

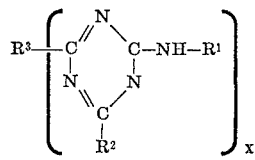

wherein R is hydrogen, a hydrocarbon group having from 1 to 12 carbon atoms, an amine group or a substituted amine group, $R^1$ is hydrogen, a hydrocarbon group having from 1 to 12 carbon atoms or an alcohol radical having from 1 to 4 carbon atoms, $R^2$ is hydrogen or a hydrocarbon group having from 1 to 12 carbon atoms, an amine group or a substituted amine group and $R^3$ is a hydrocarbon group having from 1 to 12 carbon atoms and may contain nitrogen, oxygen or sulfur, and $x$ is an integer of from 2 to 4.

The carboxamide compounds which can be employed in the present invention are those having the following structures:

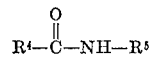

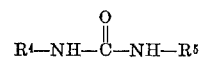

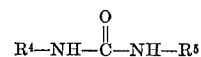

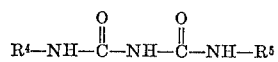

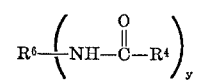

and

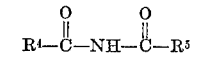

wherein $R^4$ and $R^5$ independently are hydrogen, a hydrocarbon group having from 1 to 6 carbon atoms, $R^4$ and $R^5$ can be joined to form a ring, $R^6$ is a hydrocarbon group having from 1 to 6 carbon atoms, and $y$ is an integer of from 2 to 4. The resinous high polymer

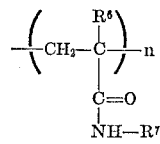

wherein $R^6$ and $R^7$ are independently hydrogen or an alkyl group having from 1 to 4 carbon atoms and $n$ is an integer representing the degree of polymerization is also useful in the present invention.

The amidine compounds which can be employed in the present invention are those having the structure

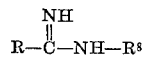

wherein R has the foregoing designation and $R^8$ is hydrogen, a cyano group or a hydrocarbon group having from 1 to 6 carbon atoms.

The specific amino triazine, carboxamide and amidine materials useful in the present invention are preferably urea, melamine, hexa-methylol melamine, benzoguanamine, acetoguanamine, β,β-iminodipropioguanamine, nitrilotriacetoguanamine, dicyandiamide, carbanilide, biuret, acrylamide, methacrylamide, polyacrylamide, N,N'-methylene-bis-acrylamide, acetyl urea, acetamide and the like. Other useful amides, amidines and amino triazines include formamide, oxamide, oxamic acid, propionamide, the butyramides, semicarbazide, N-methyl acetamide, benzamide, dimethyl formamide, nicotinamide, acetanilide, N-methyl acetanilide, N-methyl benzamide, acetamidine, N-phenyl-N'-p-tolylbenzamidine, N,N-diphenyl benzamidine, acetophenetidine, benzanilide, urethane, diphenyl urea, N-ethyl-2-naphthamide, N,N-dimethyl acetamide, p-toluidide, cyclohexane carboxamide, N,N-dimethyl succinamic acid, 2-acetamido-quinoline, 4-benzamido pyridine, 4-butyrylmorpholine, p-valerolactone, pyrrolidone, PVP, toluene sulfonamide, ethylene urea, ethylene diurea, methylol urea, 1,1'-methylene-bis-urea, methylene-bis-melamine, methylene-bis-methacrylamide, tetramethyloldimethylenetriurea, trimethylenetetraurea, methylene-bis-methylol urea, bis(hydroxymethylcarbamidomethyl) ether, mono-, di- and triallyl melamine, allyl ureas, allyl biurets, and others. From 0.1 to 20 parts by weight and preferably from 0.5 to 15 parts by weight of the amino triazine, carboxamide or amidine material per one hundred parts (phr.) of the halogen-containing polyester resin-monomer mixture are employed. Higher concentrations of the amino triazine, carboxamide or amidine than 20 parts per one hundred parts of resin have an adverse effect on the flexural strengths of these materials.

Appropriate compounding ingredients, such as fillers, free radical polymerization initiators, polymerization accelerators, plasticizers, antioxidants, resins, dyes, pigments, colors, fungicides, insecticides, antistatic agents, inhibitors, viscosity modifiers and other similar materials well known to those skilled in the art can be employed in the polyester compositions of this invention.

Among the polymerization initiators which may be included in the flame-resistant polyester compositions of this invention for the curing of same are peroxygen compounds including acetyl peroxide, benzoyl peroxide, hydrogen peroxide, t-butyl hydroperoxide, dicumyl peroxide, barium peroxide, sodium peroxide, ozone, lauroyl peroxide, succinyl peroxide, anisoyl peroxide, t-butyl perbenzoate, furoyl peroxide, toluyl hydroperoxide, cyclohexyl hydroperoxide, p-bromobenzoyl hydroperoxide, terpene peroxides, drying oil peroxides, perborates, perchlorates, ozonides, ditertiary butyl peroxide, methyl ethyl ketone peroxide, free radical producing agents, such as 1,1,2,2-tetraethyl-1,2-diphenylethane, alpha-methyl-alpha-ethyl, beta-methyl-beta-ethyl-alpha,beta-diphenyl-ethane, the azo initiators, such as azobisisobutyronitrile, ultraviolet radiation, X-rays and nuclear radiation and the like.

The flame-resistant polymerizable polyester compositions embodied in this invention are useful as intermediates or starting materials in the preparation of other and more complex polyester compositions, e.g., in the preparation of lacquers or varnish resins and enamels, but are preferably and advantageously employed in admixture with olefinic cross-linking agents to produce the polymerizable polyester resinous compositions which cure or cross-link to form insoluble, infusible thermoset polyester resin products. Such compositions and products are useful for a variety of purposes in the home and industry, such as in the preparation of glass fiber or cloth reinforced laminated panels for building construction, as potting resins, as electrical insulating resins and as flame resistant coatings for useful wood, metal and plastic objects.

Our invention is further illustrated in the following examples wherein the amounts of ingredients employed are expressed as parts by weight unless otherwise specified.

EXAMPLE I

A. A polyester was prepared by placing 3.21 moles (244 g.) of propylene glycol, 2.01 moles (197.6 g.) of maleic anhydride and 0.94 mole (400 g.) of 2,3-dicarboxy-5,8-endomethylene - 5,6,7,8,9,9 - hexachloro-1,2,3, 4,4a,5,8,8a-octahydronaphthalene anhydride (Cloran) in a 500 ml. resin kettle fitted with a mechanical stirrer, distillation condenser, nitrogen inlet and thermocouple well and heating the mixture 1 hour at 104–111° C., 1½ hours at 140° C. and 4½ hours at 190–200° C. Nitrogen was bubbled slowly through the reaction mixture for the entire reaction period and the reaction was under reduced pressure of approximately 20 inches of mercury during the final 3½ hours of the reaction period. At the end of the reaction period 0.08 g. of hydroquinone was added to the reaction mixture, and the product was poured under a nitrogen atmosphere into an enamel pan and was allowed to cool. The polyester product was found to have an acid number of 21.9 and a chlorine content of 24.75% by weight.

Seven hundred grams of the foregoing polyester were ground and dissolved in 300 g. of styrene to give a resin-monomer mixture containing 17.3% chlorine by weight. Two formulations were prepared from this resin. (1) The first formulation contained 1% benzoyl peroxide and 0.5% colloidal pyrogenic silica. (2) The second formulation contained 1% benzoyl peroxide, 0.5% colloidal pyrogenic silica and 10 parts of melamine per hundred parts of polyester resin-monomer mixture (phr.). These two formulations were prepared by weighing the resin-monomer mixture into a suitable container, adding the solid components and mixing for 10 minutes with a high speed laboratory mixer. The colloidal pyrogenic silica is helpful in the formulation in preventing the melamine from settling out during cure.

Formulations (1) and (2) from above were cast and cured into small test panels having the dimensions 8" x 8" x ⅛". After deaeration the resins were poured into molds consisting of two glass plates separated by a polytetrafluoroethylene gasket to give a cavity of the foregoing dimensions. The glass plates were faced with untreated cellophane to serve as a mold release film. The bottom glass plate, layer of cellophane and gasket were assembled horizontally, the formulation was poured in place, and the top layer of cellophane and top glass plate were put in place and the entire assembly was clamped together. The assembly was then heated in an oven at 90° C. for 1 hour and the oven temperature was then increased to 125° C. over a period of ½ hour and held at 125° C. an additional ½ hour. The mold assemblies containing the cured samples were then removed from the oven and allowed to cool.

The test panels were removed from the molds and were cut into bars having the dimensions 8" x ½" x ⅛" which were subjected to the HLT–15 Intermittent Flame Test which is more fully described in The Society of the Plastics Industry, Inc., 17th Annual Technical and Management Conference, Reinforced Plastics Division, February 1962, reprints, Section 12–H, page 3. Both panels burned continuously, but the panel (1), without melamine, had an HLT–15 flame rating of 0 while panel (2), with melamine, had an HLT–15 flame rating of 20.

B. A polyester was prepared from 1.74 moles (132.4 g.) of propylene glycol, 0.64 moles (62.4 g.) of maleic anhydride and 0.95 mole (406.4 g.) of Cloran in a manner similar to that described in A above, and the polyester was found to have an acid number of 16.2. This preparation varied from that described in A above in that 0.006 g. of copper naphthenate and 0.035 g. of mono-t-butyl hydroquinone were used as inhibitors, and the polyester product was kept in the reactor and cooled to about 135–140° C. when 250 ml. of styrene were added. This resulted in a polyester-monomer mixture which contained 32% by weight of styrene and 24.6% by weight of chlorine.

The resin-monomer mixture was formulated as in A into two formulations, (1) without melamine and (2) with 10 parts of melamine. These two formulations were cured as in A above and test strips were subjected to the HLT-15 Intermittent Flame Test. The panel without melamine (1) had an HLT-15 flame rating of 32 and an average extinguishing time of 72 seconds. The panel with melamine (2) had an HLT-15 flame rating of 56 and an average extinguishing time of 38 seconds.

EXAMPLE II

A. A polyester-monomer mixture similar to that described in Example IA which also contained 6.2 triethyl phosphate, was compounded with 1% benzoyl peroxide and 0.5% silica. Panels were prepared from this compounded resin-monomer mixture (1) without melamine and (2) with 10 phr. of melamine. The sample (1) panel was found to have an HLT-15 flame rating of 28 and burned continuously. The sample (2) panel had an HLT-15 flame rating of 88 and an extinguishing time of 52 seconds.

B. A polyester-monomer mixture similar to that described in Example IB which also contained 6% triethyl phosphate was compounded with 1% benzoyl peroxide and 0.5% silica. One portion (1) was cast into panels and another portion (2) was compounded with 10 phr. of melamine and was cast into panels. The panels from (1) were found to have an HLT-15 flame rating of 60 and an extinguishing time of 80 seconds. The panel from (2) was found to have an HLT-15 flame rating of 100 and an extinguishing time of 12 seconds.

EXAMPLE III 140 grams of a polyester derived from 1 mole of maleic anhydride, 1.6 moles of phthalic anhydride and 2.6 moles of propylene glycol were dissolved in 60 g. of styrene. This resin-monomer mix was compounded with (1) 1% benzoyl peroxide and (2) 1% benzoyl peroxide and 6% triethyl phosphate and 10 phr. melamine. These two compounds were cast and cured in the form of test panels, and the panels from both (1) and (2) were found to have HLT-15 flame ratings of 0 and they both burned continuously.

EXAMPLE IV

The procedure of Example IIA was repeated using various amounts of melamine in the formulation. The results of HLT-15 flame tests on the various cured panels are given in Table I.

TABLE I

| Melamine, phr. | HLT-15 flame rating | Average extinguishing time (seconds) |
| --- | --- | --- |
| 0 | 28 | Burns continuously (>120 seconds). |
| 0.5 | 48 | Do. |
| 1 | 56 | Do. |
| 2 | 72 | 116. |
| 10 | 88 | 52. |
| 20 | 96 | 17. |

EXAMPLE V

A series of glass-reinforced panels were prepared using the resin formulation described in Example IIA. The cured panels contained about 33% by weight of glass fiber. HLT-15 flame tests were carried out on these reinforced panels, and the results are given in Table II.

TABLE II

| Melamine, phr. | HLT-15 flame rating | Average extinguishing time (seconds) | Flexural Strength $\times 10^{-3}$ p.s.i.[1] |
| --- | --- | --- | --- |
| 0 | 36 | Continuous burning | |
| 5 | 60 | 97 | |
| 10 | 68 | 66 | 12.1 |
| 20 | 100 | 10 | 12.9 |
| 30 | | | 11.8 |
| 50 | | | 11.4 |

[1] Measured at 80° C.

EXAMPLE VI

A series of glass fiber reinforced panels were made and cured as described in Example V. The physical properties of the cured panels are given in Table III.

TABLE III

| Percent glass in panel | Melamine, phr. | Tensile strength, $\times 10^{-3}$ p.s.i. | Tensile modulus, $\times 10^{-3}$ p.s.i. | Flexural strength, $\times 10^{-3}$ p.s.i. | Flexural modulus, $\times 10^{-3}$ p.s.i. |
| --- | --- | --- | --- | --- | --- |
| 33.0 | 0 | 14.8 | 12.7 | 26.8 | 11.4 |
| 33.4 | 10 | 15.4 | 12.7 | 30.3 | 12.2 |
| 31.6 | 20.2 | 14.6 | 11.8 | 26.8 | 11.2 |

EXAMPLE VII

The amount of chlorine in the polyester-monomer mixture was varied by blending the polyester-monomer mixture described in Example IIA with the polyester-monomer mixture described in Example III. The effect of chlorine content on the flame retardant activity of melamine is shown in Table IV. The cured panels used in this experiment were unreinforced and all contained 20 phr. of melamine in the formulation.

TABLE IV

| Weight percent chlorine in polyester-monomer mixture | HLT-15 flame rating | Average extingushing time, seconds |
| --- | --- | --- |
| 0 | 4 | Continuous burning. |
| 5.8 | 28 | Do. |
| 10.0 | 56 | 56. |
| 15.9 | 100 | 9. |

EXAMPLE VIII

The procedure of Example IIA was repeated using various additives including melamine in the panel formulations. The results of HLT-15 burning tests are given in Table V.

TABLE V

| Additive | Phr. | HLT-15 flame rating | Average extinguishing time seconds |
| --- | --- | --- | --- |
| Melamine | 10 | 88 | 52. |
| $Sb_2O_3$ | 7.8 | 44 | Not determined. |
| $SbPO_4$ | 3.8 | 52 | Do. |
| $B_2O_3$ | 3.9 | 40 | Do. |
| Polyvinyl chloride | 10 | 68 | Do. |
| Hydrated alumina | 10 | 60 | 85. |
| Aluminum silicate | 10 | 32 | Continuous burning. |
| Calcium carbonate | 10 | 20 | Do. |

EXAMPLE IX

The procedure of Example III was repeated except that the polyester-monomer mixture contained 15% by weight of bromine which was introduced into the polyester molecule by use of dibromoneopentyl glycol in place of some of the propylene glycol. The polyester-monomer mixture was formulated with (1) 1% benzoyl peroxide and (2) 1% benzoyl peroxide plus 10 phr. of melamine. The formulations were cured in the form of panels and the panel from formulation (1) was found to have an HLT-15 flame rating of 24 and an extinguishing time of 65 seconds. The panel from formulation (2) was found to have an HLT-15 flame rating of 88 and an extinguishing time of 14 seconds.

EXAMPLE X

The procedure of Example IIA was repeated using 10 phr. (unless otherwise indicated) of various other additives than melamine in the polyester-monomer mixture.

The cured panels were found to have the properties listed in Table VI.

TABLE VI

| Additive | HLT-15 flame rating | Average extinguishing time, seconds |
|---|---|---|
| None | 28 | Burns continuously. |
| Benzoguanamine | 84 | Not determined. |
| Acetoguanamine | 72 | Do. |
| β,β-Iminodipropioguanamine | 100 | 20. |
| Nitrilotriacetoguanamine | 84 | 28. |
| Urea | 88 | 50. |
| Urea (20 phr.) | 100 | 6. |
| Dicyandiamide | 60 | 38. |
| Carbanilide | 76 | Not determined. |
| Hexamethylol melamine | 76 | 83. |
| Biuret | 100 | 15. |
| Acrylamide | 56 | 62. |
| Methacrylamide | 32 | >60. |
| Maleimide | 32 | Burns continuously. |
| Thiourea | No cure | |
| Acetyl urea | 76 | 92. |
| Methylene-bis-acrylamide | 72 | 66. |
| Polyacrylamide | 80 | 86. |
| Acetamide | 60 | 108. |
| N-t-octyl acrylamide | 20 | Burns continuously. |
| Nylon (Zytel 61) | 32 | Do. |
| Triallyl cyanurate | 28 | Do. |

EXAMPLE XI

A polyester was prepared as described in Example III with the exception that neopentyl glycol was used in place of the propylene glycol of Example III. This polyester resin was mixed with styrene monomer as described in Example III and to this formulation was added enough of a chlorinated paraffin wax (containing 70% by weight of chlorine) to give the polyester resin-monomer-chlorinated wax formulation a chlorine content of 14% by weight. Panels were cast and cured from this formulation (1) without and (2) with 10 parts of melamine as described in Example I. The panel from (1) was found to have an HLT-15 flame rating of 4 and the panel from (2) was found to have an HLT-15 flame rating of 20.

EXAMPLE XII

The procedures of Example I were repeated using a polyester prepared from phthalic anhydride, maleic anhydride, tetrabromophthalic anhydride and propylene glycol. This polyester resin was mixed with styrene to give a polyester resin-monomer mixture having a bromine content of 8.5% by weight. Panels were prepared by casting and curing this material (1) without and (2) with 10 phr. of melamine. The panel without melamine (1) was found to have an HLT-15 flame rating of 20 and an extinguishing time of 113 seconds. The panel with melamine (2) was found to have an HLT-15 flame rating of 76 and an extinguishing time of 40 seconds.

EXAMPLE XIII

The procedures of Example I were followed using a polyester prepared from phthalic anhydride, maleic anhydride, Diels-Alder reaction product of hexachlorocyclopentadiene also known as chlorendic anhydride (3,4,5,6,7,7-hexachloro - 3,6 - endomethylene-4-cyclohexene-1,2-dicarboxylic acid anhydride) and propylene glycol. This resin was mixed with styrene to give a polyester-monomer mixture containing about 25% by weight of chlorine. This mixture was used to prepare panels by the procedure of Example I (1) without melamine and (2) with 10 phr. of melamine. The panel from (1) was found to have an HLT-15 flame rating of 88 and an extinguishing time of 27 seconds. The panel from (2) was found to have an HLT-15 flame rating of 92 and an extinguishing time of 34 seconds.

We claim:
1. The flame-resistant composition comprising:
(A) a halogen-containing unsaturated polyester-monomer mixture containing at least 1% by weight of halogen wherein the halogen is a member selected from the group consisting of chlorine and bromine;
   (1) said unsaturated polyester being prepared by the esterification-condensation reaction of an unsaturated polycarboxylic acid or anhydride, a halogen-containing organic compound and a polyhydric alcohol; wherein (a) said unsaturated polycarboxylic acid or anhydride is a member selected from the groups consisting of maleic anhydride, maleic acid, fumaric acid, citraconic acid, itaconic acid, tetrahydrophthalic anhydride and tetrahydrophthalic acid, and optionally said unsaturated polycarboxylic acid may be in admixture with a saturated polycarboxylic acid selected from the group consisting of o-phthalic anhydride, o-phthalic acid, isophthalic acid, terephthalic acid, and adipic acid, in a molar ratio of saturated to unsaturated polycarboxylic acid of from about 0.5:1 to about 5:1, (b) said halogen-containing organic compound is at least one member selected from the group consisting of 2,3-dicarboxy-5,8-endomethylene - 5,6,7,8,9,9 - hexachloro - 1,2,3,4,4a,5,8,8a-octohydronaphthalene anhydride, chloromaleic acid, tetrachlorophthalic anhydride, tetrabromophthalic anhydride and dibromoneopentyl glycol, and (c) said polyhydric alcohol is at least one member selected from the group consisting of ethylene glycol, propylene glycol, 1,3-propanediol, neopentyl glycol, pentaerythritol, diethylene glycol, dipropylene glycol, triethylene glycol, tetraethylene glycol, and mixtures thereof;
   (2) wherein the monomer in the polyester-monomer mixture is styrene; and
(B) from about 0.5 to about 20 parts by weight per 100 parts by weight of component (A) of an aminotriazine or a carboxamide, or both, selected from the group consisting of urea, biuret, melamine, β,β-imino dipropioguanamine, and nitrilo triacetoguanamine, and mixtures thereof

2. The composition of claim 1 wherein the (A) component contains at least about 5% by weight of halogen.
3. The composition of claim 2 wherein the unsaturated polycarboxylic anhydride is maleic anhydride.
4. The composition of claim 3 wherein the polyhydric alcohol is propylene glycol.
5. The composition of claim 4 wherein the (B) component is melamine.
6. The composition of claim 4 wherein the (B) component is urea.
7. The composition of claim 1 wherein the polyester-monomer mixture is cured by heating in the presence of a polymerization initiator.

References Cited

UNITED STATES PATENTS

| 3,455,869 | 7/1969 | Ernst et al. | 260—40 |
| 3,108,987 | 10/1963 | Galli et al. | 260—864 |
| 3,361,847 | 1/1968 | Zimmermann et al. | 260—864 |

LESTER L. LEE, Primary Examiner

U.S. Cl. X.R.

117—132 B, 148, 161 K; 260—869, 873, DIG 24